: 3,794,513
PROCESS OF APPLYING A POLYMERIC ADHESIVE LAYER BETWEEN A PHOTOCHROMIC SPIROPYRAN COMPOUND CONTAINING LAYER AND A POLYESTER FILM SUPPORT
Werner Krafft, Leverkusen, and Peter Kruck, Cologne-Flittard, Germany, assignors to Agfa-Gevaert Aktiengesellschaft, Leverkusen, Germany
No Drawing. Filed Apr. 12, 1972, Ser. No. 243,413
Claims priority, application Germany, Apr. 14, 1971,
P 21 18 021.2
Int. Cl. B44d 1/092; G03c 1/00, 1/80
U.S. Cl. 117—34                        1 Claim

ABSTRACT OF THE DISCLOSURE

In a photochromic material containing on a polyester film support photochromic spiropyrans incorporated in poly(meth)acrylate binders, there is an adhesive layer arranged between the photochromic layer and the support, which adhesive layer consists of copolymers of vinyl chloride and vinyl acetate which may be partly saponified, and/or poly(meth)acrylic acid esters of aliphatic or cycloaliphatic alcohols having 1 to 8 carbon atoms. The adhesive layer is applied to the film support from an organic solvent containing chloral hydrate or chloral methylate as swelling agent, and this layer is dried at between 60° C. and 90° C.

---

The invention relates to photochromic film materials in which a photochromic layer containing spiropyrans is arranged on a film support of high molecular weight polyalkylene terephthalates, the photochromic layer being bonded to the film support by means of an adhesive layer.

Various processes are known for firmly bonding hydrophobic layers of synthetic resins to foils of condensation products of terephthalic acid and glycols but all these processes deal only with the application of relatively thin layers of synthetic resin of less than 10μ in thickness. Moreover, these layers contain only compounds which are not sensitive to the swelling agents used for effecting the bond.

Other processes, in which non-ionogenic swelling agents or pure synthetic resins which require curing are used require the employment of elevated drying temperatures of over 100° C. and up to 150° C. This is undesirable and either difficult or completely impractical owing to the complicated apparatus which would be required for applying these materials.

Photochromic layers based on spiropyrans have been disclosed as such in German Auslegeschrift No. 1,274,655 and in Wiss. Ber. AEG-Telefunken, 42 (1969), 1, pp. 17–23. For sensitometric reasons, these layers are required to have a thickness of 10 to 25μ, preferably 18 to 20μ, and the spiropyrans which are used in these layers as photochromic compounds are not only sensitive to UV light but also very sensitive to traces of acid solvents and swelling agents for polyalkylene terephthalates such as halosulfonic acids, chromosulfuric acid or halogenated carboxylic acids. They react with these substances with ring opening to form a blue color so that the unexposed layer has a basic blue fog which severely reduces the difference in color density between unexposed non-image areas and exposed image areas which is necessary for making the image clearly visible. The fog therefore also indirectly reduces the effective sensitivity of the layer and hence the rate of recording the image.

Another peculiarity of these photochromic layers is that for sensitometric reasons only certain, preferably high molecular weight, synthetic resins may be used, which absorb only at or below about 260 nm. because recording of the information is preferably carried out with laser light of 257 nm.

The material best suited to meet these sensitometric and casting technical requirements is a photochromic layer which contains, as binder, high molecular weight homopolymers or copolymers of acrylic or methacrylic acid esters of aliphatic or cycloaliphatic alcohols having 1 to 8 carbon atoms, especially polymers or copolymers of acrylic acid or methacrylic acid esterified with aliphatic alcohols having 1 to 4 carbon atoms. The preferred comonomer used for making the copolymers is styrene or α-methylstyrene. For stabilizing the image dye produced from the spiropyrans, the photographic layers may contain in addition to the spiropyrans solid organic layers may contain in addition to the spiropyrans solid photosensitive halogen compounds, e.g. 2,2,2-tribromoethanol which on exposure to UV light split off hydrogen halide, which together with the exposed spiropyran produces α stable pyrylium salt.

Attempts to find suitable bonding layers for producing a firm bond between the photochromic layers and their polyester supports have met with numerous difficulties. Firstly, it was found that the sensitivity of the photochromic layers may be adversely affected by the binder used for preparing the adhesive layers and secondly the solvents or swelling agents for the supports which were used for applying the adhesive layers caused the formation of a color fog in the photochromic layer.

It is an object of the invention to provide a photochromic material in which the photochromic layer is firmly bonded to a film support based on high molecular weight polyalkylene terephthalates by means of an adhesive layer which will not adversely affect the sensitometric properties of the photochromic layer.

According to the invention, this problem is solved by arranging between the film support of high molecular weight polyalkylene terephthalate and the layer which contains spiropyrans an adhesive layer in which the binders consist of copolymers of vinyl chloride and vinyl acetate which may be partly saponified and/or poly(meth)-acrylates which latter polymers are the same substances as those used as binders for the photographic layer.

Particularly suitable copolymers for this purpose are copolymers of 80 to 92% by weight of vinyl chloride and 8 to by weight of vinyl acetate. The partly saponified copolymers preferably contain 45 to 70% by weight of vinyl chloride, 10 to 40% by weight of vinyl acetate and 5 to 30% by weight of vinyl alcohol. Preferred suitable binders for the adhesive layer are poly(meth)acrylates which also are used in the photochromic layer. These can also be used in admixture with the copolymers of vinyl chloride and vinyl acetate mentioned before.

It has also been found to be advantageous to use special solvents or swelling agents for applying the adhesive layer, namely chloral hydrate or chloral methylate. The swelling agents are generally used in such quantities that the proportion of swelling agent to binder is in the range of 5:1 to 30:1. The use of these special swelling agents enables the adhesive layers to be applied from organic solutions to the polyester support and the solvent may then be evaporated at relatively low temperatures of 60 to 90° C. without a color fog being produced in the subsequently applied photochromic layer. No color fog is produced even if the photochromic layer contains highly reactive spiropyrans in combination with appropriate hydrogen halide donors such as tribromoethanol. It has also been found to be advantageous to add small quantities (about 0.05 to 1% by weight, based on binder) of a silicone oil, based on methyl phenyl polysiloxanes, to the casting solutions for the photochromic layer and/or for the adhesive layer to increase the evenness of application of the layer. The adhesive layer is applied from a solution in organic solvents. Suitable solvents are alcohols such as methanol or ethanol, ketones such as acetone or methylethylketone and halogenated hydrocarbons such as chloroform, dichloromethane or dichloroethane. The concentration of the casting solutions is adjusted so that the amount of binder applied is about 1 to 4 g./m.²

EXAMPLE 1

The solution described below is applied by the immersion process to a polyester film support about 100µ in thickness to produce an adhesive layer and dried at about 80° C.:

10 ml. of polymethylmethacrylate (molecular weight approximately 100,000) (10% in chloroform),
17.5 g. of chloralhydrate,
30 ml. of chloroform,
50 ml. of dichloroethane,
0.1 ml. of silicone oil PN 200 (10% in chloroform). PN 200 is a poly(phenylmethyl)siloxane and is marketed by Farbenfabriken Bayer AG, Leverkusen, Germany.

A photochromic layer is then applied to this adhesive layer from the following solution:

25 ml. of a 40% solution in chloroform of polymethylmethacylate molecular weight (approximately 150,000),
45 ml. of 1,2-dichloroethane,
0.64 g. of a naphthobenzospiropyran such as 3'-n-amyl-7'-methoxy-spiro - 3H - naphto - (2,1-b)pyrano-3,2'-2H-benzo-(1)pyran,
2.6 g. of tribromoethanol,
0.6 ml. of silicone oil, 10% in chloroform.

A photochromic layer having a thickness of 18 to 20µ is obtained after drying at 60 to 70° C.

The photochromic layer dries on the adhesive layer with no trace of blue fog, is very firmly bonded to its support and is in no way deleteriously affected in its sensitometric properties by the adhesive layer. If chloral hydrate is replaced by dichloroacetic acid in the above formulation for the adhesive layer, the material obtained after application of the photochromic layer has an intense blue fog in the photochromic layer.

EXAMPLE 2

Example 1 is modified in that the following formulation is used for preparing the adhesive layer:

10 ml. of a 10% solution in chloroform of a copolymer of 91% of vinyl chloride and 9% of vinyl acetate,
30 ml. of chloroform,
50 ml. of dichloroethane,
18 g. of chloral methylate ($CCl_3 \cdot CH(OH)(OCH_3)$),
0.1 ml. of silicone oil, 10% in chloroform.

A photochromic layer of nearly the same composition of that of Example 1, but having only 0.15 g. of the spiropyran, is applied to this material. This layer is very firmly bonded to its support and completely free from blue fog.

As the examples illustrate, the photochromic layer is produced with the aid of casting solutions in which the solvents for the binder and for the photochromic substances contain halogenated hydrocarbons which are so chosen that evaporation of the solvent after application of the casting solution to the adhesive layer may be carried out at temperatures of about 60 to 70° C.

What is claimed is:

1. The method of preparing a photochromic film material having on a polyester film support an adhesive layer and carrying thereon a photochromic layer comprising a photosensitive spiropyran in a binder selected from the group consisting of a homopolymer of an alkyl or cycloalkyl acrylate or methacrylate wherein the alkyl and cycloalkyl groups have from 1 to 8 carbon atoms, and a copolymer of said alkyl or cycloalkyl methacrylate with styrene or α-methylstyrene, the improvement which comprises applying said adhesive layer to said polyester film support by casting on said support a solution containing, in an organic solvent, chloral hydrate or chloral methylate and a binder selected from the group consisting of:

(a) a copolymer of vinyl chloride with vinyl acetate, which may be partly saponified,
(b) a homopolymer of an alkyl or cycloalkyl acrylate or methacrylate wherein the alkyl and cycloalkyl groups have from 1 to 8 carbon atoms, and
(c) a copolymer of said alkyl or cycloalkyl acrylate or methacrylate with styrene or α-methylstyrene, and drying the applied layer at between 60° C. and 90° C.

References Cited
UNITED STATES PATENTS

| | | | |
|---|---|---|---|
| 2,627,088 | 2/1953 | Alles et al. | 96—75 X |
| 3,397,059 | 8/1968 | Dorion et al. | 96—87 |
| 3,201,249 | 8/1965 | Pierce et al. | 96—87 |
| 3,674,531 | 7/1972 | Shephard et al. | 96—87 |

NORMAN G. TORCHIN, Primary Examiner

W. H. LOUIE, Jr., Assistant Examiner

U.S. Cl. X.R.

96—87, 90 PC; 117—76 F